United States Patent [19]
Demmel et al.

[11] Patent Number: 6,048,821
[45] Date of Patent: *Apr. 11, 2000

[54] $SO_X$ ADDITIVE SYSTEMS BASED UPON USE OF MULTIPLE PARTICLE SPECIES

[75] Inventors: Edward J. Demmel, Newport Beach, Calif.; Albert A. Vierheilig, Richmond Hill, Ga.; Regis B. Lippert, Sea Girt, N.J.

[73] Assignee: Bulldog Technologies U.S.A., Inc., Wilmington, Del.

[ * ] Notice: This patent is subject to a terminal disclaimer.

[21] Appl. No.: 08/746,837

[22] Filed: Nov. 18, 1996

[51] Int. Cl.$^7$ .............................. B01J 21/04; B01J 27/16; B01J 31/00; B01J 8/00
[52] U.S. Cl. .............................. 502/439; 502/72; 502/73; 502/74; 502/80; 502/84; 502/102; 502/103; 502/113; 502/303; 502/304; 502/305; 502/314; 502/315; 502/316; 502/319; 502/333; 502/334; 502/335; 502/336; 502/339; 502/353; 502/406; 502/410; 502/415; 423/244.01; 423/244.02; 423/244.04; 423/244.06
[58] Field of Search ..................................... 502/439, 517, 502/72, 73, 74, 80, 84, 102, 103, 113, 300, 303, 304, 305, 314–316, 319, 333–339, 353, 406, 410, 415; 423/244.01, 244.02, 244.04, 244.06, 244.07, 244.1

[56] References Cited

U.S. PATENT DOCUMENTS

| | | | |
|---|---|---|---|
| 3,835,031 | 9/1974 | Bertolacini | 208/120 |
| 4,369,130 | 1/1983 | Bertolacini | 252/455 |
| 4,381,991 | 5/1983 | Bertolacini | 423/244 |
| 4,405,443 | 9/1983 | Bertolacini | 208/113 |
| 4,423,019 | 12/1983 | Bertolacini | 423/244 |
| 4,472,267 | 9/1984 | Yoo et al. | 502/524 |
| 4,497,902 | 2/1985 | Bertolacini | 502/65 |
| 4,589,978 | 5/1986 | Green et al. | 208/113 |
| 5,057,205 | 10/1991 | Chin et al. | 502/521 |
| 5,288,675 | 2/1994 | Kim | 502/303 |
| 5,399,327 | 3/1995 | Kim | 423/244.11 |
| 5,407,878 | 4/1995 | Kim | 502/303 |
| 5,422,332 | 6/1995 | Demmel | 502/414 |
| 5,545,604 | 8/1996 | Demmel | 502/302 |
| 5,627,123 | 5/1997 | Kim | 502/341 |
| 5,792,436 | 8/1998 | Feeley et al. | 423/210 |

*Primary Examiner*—Mark L. Bell
*Assistant Examiner*—Patricia L. Hailey
*Attorney, Agent, or Firm*—Dorr, Carson, Sloan & Birney, P.C.

[57] ABSTRACT

The useful life of $SO_X$ additives having a $SO_2 \rightarrow SO_3$ oxidation catalyst component and a $SO_3$ absorption component can be extended by employing each of these components as separate and distinct physical particles, pellets, etc., with each component having large proportions of certain ingredients and having small proportions of certain other ingredients.

36 Claims, No Drawings

$SO_X$ ADDITIVE SYSTEMS BASED UPON USE OF MULTIPLE PARTICLE SPECIES

BACKGROUND OF THE INVENTION

1. Field of the Invention

This invention generally relates to methods and compositions for reducing sulfur levels in flue gases generated by hydrocarbon catalytic cracking units, coal and/or oil-fired power plants and chemical manufacturing facilities.

2. Description of the Prior Art

Sulfur is often a component of the feedstocks processed by many industrial facilities. It also is found in the fossil fuels used to power and/or create process heat for such facilities. Hence, the sulfur contained in such materials has the potential to become an atmospheric pollutant—especially when it takes the form of those sulfur oxide gases that become a part of the flue gases emitted from such facilities. Such emissions are particularly harmful to the atmosphere and, hence, are the subject of extensive governmental regulation. One of the most commonly used methods for preventing release of these sulfur oxide gases into the atmosphere is to capture them through use of compounds that have an ability to absorb them.

For example, in the case of recovering sulfur oxide gases from flue gases generated by fluid catalytic cracking units (FCC units) used to crack petroleum feedstocks, microspheroidal catalyst particles having chemical activities toward sulfur oxide gases are circulated in admixture with the microspherical particles used to carry out the petroleum cracking function. These hydrocarbon cracking catalyst particles are often referred to as "bulk" or "FCC" catalysts while the sulfur catalyst particles are often referred to as "$SO_X$ additives."

During the hydrocarbon cracking process, a coke-like material that also contains a sulfur component—if sulfur is contained in the petroleum feedstock—is deposited on the $SO_X$ additive particles as well as on the FCC catalyst particles. Both kinds of particles, and hence the coke and sulfur deposited on them, are carried from the FCC unit's reactor to its catalyst regenerator. Here, the coke, and whatever sulfur that is contained in that coke, is "burned off" both kinds of catalyst particles. The sulfur component of such coke/sulfur deposits forms sulfur oxide gases (e.g., sulfur dioxide and sulfur trioxide which are often collectively referred to as "$SO_X$" gases). Unless captured, these $SO_X$ gases would be emitted to the atmosphere along with other flue gases given off by the catalyst regenerator (e.g., carbon monoxide, carbon dioxide, nitrous oxides, etc.).

In other kinds of industrial facilities (e.g., coal-fired power plants and certain chemical manufacturing plants), $SO_X$ additives are usually employed in the form of larger particles such as pellets that are not circulated throughout the facility in the form of microspheroidal particles, but rather are used in so-called "fluid bed" or "fixed bed" catalyst systems. In such systems, these catalyst pellets perform their $SO_X$ additive functions in a more localized region—as opposed to being circulated throughout the entire unit. These fixed bed and fluid bed systems are usually provided with so-called "swing reactors" which provide more than one fluid bed or fixed bed so that at least one bed can be used to capture $SO_X$ while at least one other bed is being regenerated. Be these swing reactor configurations as they may, they too produce sulfur-containing flue gases. Thus, even though the sulfur contained in the fossil fuels used to power electrical power plants and/or provide process heat for chemical manufacturing facilities is converted into $SO_x$ gases in a manner somewhat different from that of FCC units, the end result is the same; unless captured, their $SO_X$ emissions can and do enter, and pollute, the atmosphere.

Many materials have been used to prevent, or at least reduce, $SO_X$ emissions from all such industrial facilities. The $SO_X$ absorbing component of these additives is normally a metal oxide of one kind or another. Generally speaking, these metal oxides carry out their $SO_X$ capturing function by forming metal sulfates when they are exposed to $SO_X$-containing gases, especially under high temperature conditions. A more complete identity of these metal oxides will be provided in later portions of this patent disclosure.

Regardless of their identity, however, regeneration of "sulfated" $SO_X$ additive particles usually involves converting them from their "contaminated" metal sulfate forms back to their "uncontaminated" metal oxide forms. For example, in the case of a FCC unit, the metal sulfate forms of the $SO_X$ additive (that are produced in the catalyst regenerator unit) are circulated, in admixture with regenerated hydrocarbon cracking catalyst, from the catalyst regenerator unit back to the FCC unit's hydrocarbon cracking reactor zone. Here, the petroleum feedstock is cracked and the sulfur components of the $SO_X$ additive particles are converted to hydrogen sulfide gas by the hydrocarbon/hydrogen rich atmosphere existing in such reactor zones. As a consequence of this, the metal sulfate component of a $SO_x$ additive is reduced to its metal oxide form and, thus, is made ready for subsequent reuse in the catalyst regenerator. The hydrogen sulfide gas produced in the FCC reactor unit is eventually captured and ultimately reduced to elemental sulfur in ways well known to the chemical engineering arts.

In the case of fluid bed or fixed bed catalyst systems such as those used to control $SO_X$ emissions from power plants, the $SO_X$ additive is usually regenerated by passing a hydrocarbon-containing gas through a $SO_x$ additive bed during a swing reactor regeneration cycle. This operation also serves to convert those metal sulfates contained in the used, $SO_x$ additive pellets back to their metal oxide forms. Methane, propane, and butane gases, as well as hydrogen gas itself, are used to carry out the regeneration of such $SO_X$ additives in these fixed bed or fluid bed systems.

Regardless of the exact nature of the industrial process being carried out, and regardless of the physical size of the $SO_X$ additive materials being used, and regardless of the method used to regenerate such materials, any given $SO_X$ additive system must perform at least three basic functions with respect to the sulfur oxide gases they seek to capture. First, these $SO_X$ additive systems must oxidize $SO_2$ to $SO_3$; second, they must absorb the $SO_3$ once it is formed; and third, they must be able to "give up" the captured $SO_3$ in order to be regenerated. The need to convert $SO_2$ to $SO_3$ follows from the fact that very few materials are capable of both absorbing $SO_2$ gas and withstanding the high temperature conditions where the $SO_2$ is created. There are, however, many materials (e.g., various metal oxides) that are both capable of absorbing $SO_3$ and withstanding the high temperature environments where it is formed.

In most cases, these metal oxides are bivalent and/or trivalent metal oxides. For example, magnesia and/or alumina have been widely employed as $SO_X$ additives in many different kinds of hydrocarbon catalytic cracking systems. By way of example, U.S. Pat. Nos. 4,423,019; 3,835,031; 4,381,991; 4,497,902; 4,405,443 and 4,369,130 teach $SO_x$ catalytic and/or absorbent activities for various metal oxides.

The prior art also has long recognized that certain metals (e.g., cerium, vanadium, etc.) and their oxides (e.g., ceria, vanadia) can be employed in $SO_X$ additive systems in order to improve their ability to oxidize $SO_2$ to $SO_3$. Indeed, it might even be said that, to a very large degree, the prior art with respect to using metal oxide materials as $SO_X$ oxidants and/or absorbents has, for the past several decades, largely concerned itself with finding better ways of associating various catalytically active metals (e.g., cerium, vanadium, etc.) with all manner of metal oxide materials in order to enhance the resulting material's $SO_X$ catalyzing and/or absorbing capabilities.

Some metal oxides also are known to improve the "release" of the sulfur component of "used" $SO_X$ additives when it comes time for them to be reduced back to their metal oxide forms. For example, U.S. Pat. No. 4,589,978 ("the '978 patent") teaches $SO_X$ transfer catalysts based upon the use of rare earth metals such as cerium and lanthanum. The '978 patent also teaches use of alumina to absorb $SO_3$ by forming aluminum sulfate in circumstances wherein the alumina is employed in the form of a separate and distinct particle species that is used in admixture with other particles that contain a $SO_2 \rightarrow SO_3$ oxidant. To these ends, the '978 patent states: "The $SO_X$ transfer catalyst of the present invention preferably includes a metal oxide such as alumina to absorb $SO_3$ as sulfate. The alumina may be circulated as a separate particle or used as a support for the rare earth component. Preferably, the alumina is an active form with high surface area, which includes synthetic alumina in gamma, theta, etc. forms as well as natural aluminas."

We would specifically note here that the '978 patent at least, in principle, recognizes that its alumina $SO_3$-absorbing component "may be circulated as a separate particle . . . ". We also would note that the above-quoted phrase goes on to say that its alumina may be "used as a support for the rare earth component." Later, the '978 patent goes on to say that its " . . . alumina and rare earth components can be further supported on an inert support or matrix which does not react with $SO_2$ or $SO_3$ to form sulfate. The supports for the alumina and rare earth oxidation component may be selected from silica, silica/alumina, zeolites, kieselguhr, celite or alumina." We have quoted these passages from the '978 patent because, in some ways, the teachings of this patent reference define certain "points of departure" that help to establish and define the borders of the novel aspects of the invention described in this patent disclosure. Therefore, the teachings of the '978 patent are incorporated herein in their entirety.

SUMMARY OF THE INVENTION

The present invention is based upon three conjunctive findings. The first finding carries applicants' invention beyond the general teachings of the '978 patent concerning the possible use of $SO_2$ oxidant catalyst particles that might be separate and distinct from the system's $SO_3$ absorbent particles. The hereindescribed $SO_X$ additive systems and processes—employing at least one $SO_2 \rightarrow SO_3$ oxidation catalyst component in a first particle species and at least one $SO_3$ absorbent component in a second particle species—require that at least one $SO_2 \rightarrow SO_3$ oxidation catalyst component of applicant's overall $SO_X$ additive system be physically separate and distinct from the $SO_3$ absorbent component of said $SO_X$ additive system. In other words, applicant's $SO_X$ additive systems will have at least two distinct particles species wherein the first particle species primarily carries out a $SO_2 \rightarrow SO_3$ oxidation function. The second particle species will primarily carry out a $SO_3$ absorption function. The second particle species may, however, also carry out a $SO_2 \rightarrow SO_3$ oxidation function.

Applicants' second finding revolves around the fact that certain ingredients are particularly effective in formulating each of the different particle species of applicant's overall $SO_X$ additive system. Applicant's third finding is that some of the ingredients taught in the '978 patent (and, indeed, that are taught throughout the prior art regarding $SO_X$ additives) should be used rather sparingly—or better yet, not used at all—in applicants' multi-particle, $SO_X$ additive systems. More will be said about these limitations and/or prohibitions in subsequent parts of this patent disclosure.

The hereinafter described invention also is based upon applicants' recognition that use of most prior art $SO_X$ additive systems heavily depends upon some rather crude empiricisms that, for reasons that also will be hereinafter more fully described, result in a great deal of waste of the ingredients used to make $SO_X$ additives. More specifically, applicants have recognized that there are situations in the use of $SO_X$ additives where an industrial plant operator may want relatively less $SO_2 \rightarrow SO_3$ oxidation capacity, and relatively more $SO_3$ absorption capacity in a given $SO_X$ additive system. There also are situations where just the opposite is true.

By way of example of the first situation, a FCC operator may want a relatively large amount of $SO_2$ oxidation capacity in those cases where the bulk, hydrocarbon cracking catalyst being employed in the FCC unit at a given time is itself also capable of absorbing some of the $SO_3$ formed in the catalyst regenerator unit. This ability follows from the fact that some FCC, hydrocarbon cracking catalysts are made with matrix materials (e.g., alumina and magnesia) that will absorb $SO_3$ as well as serve as matrix-forming materials for the hydrocarbon cracking catalyst particles that are embedded in the overall catalyst particle (e.g., magnesia and alumina are often employed in the matrix-forming materials used to bind various zeolite particles that are employed in many bulk, hydrocarbon cracking catalyst). Many other hydrocarbon cracking catalysts, however, are made with matrix-forming materials that have little or no $SO_3$ absorbing ability.

Thus, in those cases where a given hydrocarbon cracking catalyst being employed in an FCC unit also has the added ability to absorb $SO_3$, the overall $SO_X$ additive system (wherein the term "system" should be taken to imply the presence of at least one $SO_2 \rightarrow SO_3$ oxidation catalyst component, and at least one $SO_3$ absorbent component) should contain enough sulfur oxidant to produce all the $SO_3$ that the total catalyst system can absorb—taking into consideration the fact that a given FCC hydrocarbon cracking catalyst may itself have the ability to absorb some of the $SO_3$ produced by the sulfur oxidant catalyst. In other words, in those cases where a given FCC hydrocarbon-cracking catalyst also has the ability to absorb $SO_3$, the FCC operator would prefer a mixture of $SO_2$ oxidant and $SO_3$ absorbent that is relatively "rich" in the oxidant component of the $SO_X$ additive system.

On the other hand, in those cases where the hydrocarbon cracking catalyst matrix has little or no $SO_3$ absorption capability, little or no "extra" $SO_2 \rightarrow SO_3$ oxidant is needed beyond what is needed to produce the amount of $SO_3$ that actually can be absorbed by the $SO_3$—capturing component of the $SO_X$ additive system. The operator's adjustment problem (indeed, his dilemma) follows from the fact that, notwithstanding the teachings of the '978 patent concerning the possibility of using separate $SO_3$ absorbents, commercially available $SO_X$ additive systems are formulated in the form of a single particle species that contains both the $SO_2 \rightarrow SO_3$ oxidant component (e.g., ceria, vanadia, etc.) and the $SO_3$ absorbent component (e.g., alumina, magnesia, etc.). Thus, when using such single particle $SO_X$ additive systems, if the operator wants to add more oxidant, more absorbent is inherently added. Consequently, in certain operations, addition of more $SO_2 \rightarrow SO_3$ catalyst will "waste" some of the $SO_3$ absorbent capacity of any $SO_X$ additive that is introduced into the unit in the form of a single particle species.

Conversely, a need for relatively more $SO_3$ absorbent occurs when a $SO_X$ additive is provided to a FCC unit that is being used in a mode of operation known as "partial burn." In this mode of operation, the combustion air admitted to the FCC regenerator unit is purposely limited so that there only will be a small excess of oxygen in the flue gas. This is done in order to limit undesired combustion of carbon monoxide to carbon dioxide. Thus, in this mode of operation, a FCC operator would prefer to have a relatively larger amount of absorbent and a relatively smaller amount of oxidant. That is to say that the operator would prefer to limit the amount of oxidant so that there is only enough of it to convert sulfur dioxide to sulfur trioxide without there also being enough to convert carbon monoxide to carbon dioxide. In this case, if the operator wants to add more absorbent, more oxidant is inherently added where only a single particle species $SO_X$ additive is available. Consequently, the "extra" oxidant component of a single particle $SO_X$ additive will be wasted during this mode of operation—indeed, it will be detrimental to it.

FCC operators also experience many "upset" conditions. Not the least of these are those caused by changes in the sulfur concentration in feedstocks. Such upsets often require that changes be quickly made in either the concentration of the $SO_x$ oxidant or the concentration of the absorbent. Consequently, most operators usually respond to such upset conditions by immediately addressing the most pressing upset condition existing at the moment—regardless of waste of "unused" component oxidant, or waste of "unused" absorbent, that may be contained in a single particle $SO_x$ additive system. Indeed, many such upsets could be prevented if the plant operator had a multi-particle $SO_x$ additive system at his command.

Applicants also have found that there are even more subtle considerations that can be addressed through independent addition of either the $SO_2 \rightarrow SO_3$ oxidant catalyst, or the $SO_3$ absorbent. They revolve around the "aging rate" of the oxidant component of an $SO_X$ additive system relative to the usually different "aging rate" of its $SO_3$ absorbent component. In actual industrial operations such as petroleum cracking, there is no presently known way of accurately predicting the useful life of either the oxidation component, or the absorbent component, of a given $SO_X$ additive in a given FCC unit. That is to say that depending on such factors as the nature of the feedstock being processed, the product being produced and the mechanical features of a given refinery, the $SO_2$ oxidant may "die" before the $SO_3$ absorbent, or vice-versa. Thus, in a $SO_X$ additive system comprised of only a single particle species that contains both a $SO_X$ oxidation component and a $SO_X$ absorbent component, there is usually a subtle waste of functional capacity of one or the other of these two components because they rarely "die" at the same time. In other words, in a single particle species $SO_X$ additive system, one of these two components usually dies while the other component still has some remaining "useful life". In effect, the hereindescribed compositions and processes provide a method for "using up" any remaining useful life in either of these two components. Therefore, a major advantage of applicant's multi-particle $SO_X$ additive systems—relative to single particle $SO_X$ additive systems—is their ability to maximize usage of each of the two main active components of an $SO_X$ additive system (i.e., the $SO_2 \rightarrow SO_3$ oxidant component and the $SO_3$ absorbent component), regardless of how they age relative to each other in any given industrial facility.

Thus, overall, use of the hereindescribed compositions and processes provide the FCC operator with many operating advantages that are not attainable through use of single particle species, $SO_x$ additive systems. These advantages include greater flexibility in: (1) compensating for cracking catalyst that do—or do not—have $SO_3$ absorption capabilities, (2) controlling partial burn operations, (3) preventing, and more effectively and efficiently controlling upsets in the operation of a given industrial facility and (4) more completely utilizing all of the active ingredients in a given $SO_X$ additive system under ever-varying operating conditions.

General Nature of Applicant's $SO_x$ Additive Systems

The first component of applicants' overall $SO_X$ additive system is a $SO_2 \rightarrow SO_3$ oxidation catalyst component. This component can be made and used in the form of microspheroidal particles, pellets, lumps, etc. depending upon its intended end use. The second component is a $SO_3$ absorbent component. It too can be made and used in the form of particles, pellets, etc. Thus, for the purposes of this patent disclosure, the term "particle(s)" should be taken to include those pellets used in fixed bed and fluid systems—as well as those smaller, microspheroidal particles used in FCC operations. In order to practice this particular invention however, at least one $SO_3$ absorbent component particle species must be used in the form of physically separate and distinct particles, pellets, etc. from at least one $SO_2 \rightarrow SO_3$ oxidation catalyst particle species.

The relative proportions of the $SO_2 \rightarrow SO_3$ oxidation catalyst component to the $SO_3$ absorbent component can vary considerably in the practice of this invention. For example a $SO_2 \rightarrow SO_3$ oxidation catalyst component (which may comprise one or more species of $SO_2 \rightarrow SO_3$ oxidation particle(s)) can comprise from about 10 to about 90 weight percent of applicants' overall $SO_x$ additive system. Similarly, the $SO_3$ absorbent component (which may, likewise, comprise one or more species of $SO_3$ absorbent particle(s)) can constitute from about 10 to about 90 weight percent of the additive system. These two components can be separately introduced into a given industrial facility, or they can be premixed and introduced into such a facility as a mixture.

It also should be noted that applicants' $SO_2 \rightarrow SO_3$ catalyst components may inherently have some $SO_3$ absorbent capability and that applicants' $SO_3$ absorbent components may inherently have some $SO_2 \rightarrow SO_3$ oxidation catalyst ability. Nonetheless, practice of this invention requires that at least one of applicants' particle species primarily carry out a $SO_2$ oxidation function while and at least one other, physically separate and distinct particle species, carries out the $SO_3$ absorption function. This $SO_3$ absorption function may be the only duty of the $SO_3$ absorbent component. In some embodiments of this invention, however, the $SO_3$ absorbent component also may be provided with a $SO_2 \rightarrow SO_3$ oxidation catalyst so that the resulting material is capable of carrying a $SO_2$ oxidation function as well as a $SO_3$ absorption function.

The $SO_2 \rightarrow SO_3$ oxidation component of the hereindescribed $SO_x$ additive systems may itself be comprised of two or more separate and distinct particle species. For example a first $SO_2 \rightarrow SO_3$ oxidation catalyst component could employ ceria as its $SO_2 \rightarrow SO_3$ oxidation ingredient while a second $SO_2 \rightarrow SO_3$ oxidant catalyst component employs vanadia as its $SO_2 \rightarrow SO_3$ oxidant ingredient. The same is also true of applicants' $SO_3$ absorbent component. For example, a first $SO_3$ absorbent component could employ a calcium oxide $SO_3$ absorbent while a second $SO_3$ absorbent component employs a magnesium oxide $SO_3$ absorbent component. And, as was noted in the preceding paragraph, at least one $SO_3$ absorbent catalyst species can be provided with an $SO_2 \rightarrow SO_3$ oxidation catalyst and thereby simultaneously serve as a "second" oxidation catalyst component as well as a $SO_3$ absorbent component. In such cases, the $SO_3$ absorbent will serve to pick up $SO_3$ produced by the separate and distinct $SO_2 \rightarrow SO_3$ oxidation catalyst particle as well as the $SO_3$ produced by the $SO_2$ oxidant in the $SO_3$ absorbent particle itself.

Such $SO_2 \rightarrow SO_3$ oxidation catalysts and such $SO_3$ absorbents can be used in association with the same kind of, or with different, support materials. Applicants also have found that their oxidation catalyst component(s) and their $SO_x$ absorbent component(s) are preferably used in admixture with each other—as opposed to being used sequentially—that is to say by locating a zone where the $SO_3$ absorption takes place "down stream" from a different zone where the $SO_2 \rightarrow SO_3$ oxidation takes place. And as a final note on the general use of the hereindescribed $SO_X$ additive systems, applicants would note that their $SO_x$ additive systems can be used with a very wide variety of hydrocarbon cracking catalysts. At the very least, such hydrocarbon cracking catalysts would include any of those natural or synthetic crystalline aluminosilicate zeolites (e.g., faujasite zeolites of the X and Y type) commonly used for such purposes, as well as various amorphous metal oxides, (e.g., amorphous alumina) having hydrocarbon cracking activities. Those skilled in this art will appreciate that a hydrocarbon cracking catalyst component will constitute a major portion of those hydrocarbon cracking catalyst/$SO_x$ additive mixtures used in industrial facilities such as FCC units. For the most part, applicants' $SO_x$ additives will comprise only from about 0.5 to about 10.0 weight percent of such hydrocarbon cracking catalysts/$SO_x$ additive mixtures.

$SO_2 \rightarrow SO_3$ Oxidation Catalyst Components

Applicants' $SO_2 \rightarrow SO_3$ oxidation catalyst component is comprised of at least two general kinds of ingredients. The first of these two general kinds of ingredients is a sulfur dioxide oxidation catalyst ingredient that is inherently capable of oxidizing $SO_2$ to $SO_3$ in an environment where the $SO_2$ is created. Most preferably, this $SO_2 \rightarrow SO_3$ oxidation catalyst ingredient will comprise: (1) a metal selected from the group consisting of those metals having an atomic number of at least 20, a metal from Groups 1b and 2b of the Periodic Table, a metal from Groups III to VIII of the Periodic Table, and/or a rare earth metal of the Periodic Table. Of these metals, cerium, vanadium, platinum, palladium, rhodium, molybdenum, tungsten, copper, chromium nickel, manganese, cobalt, iron, ytterbium and uranium are preferred. And, of these, cerium and vanadium are the most preferred—and especially when they are used in conjunction with each other—but not necessarily in the same particle species.

These metals may be employed in their "free" or uncompounded metallic forms (e.g., metallic platinum) as well as in chemically compounded forms (e.g., in the form of their oxides) in applicants' end products. Thus the term "metal", for the purposes of this patent disclosure should be taken to mean chemically compounded metals as well as uncompounded, elemental metals. It also should be noted that when these metals are first introduced into the "wet" reaction systems used in making the hereindescribed $SO_x$ additives, they may be in various salt forms, e.g., their oxides, nitrates, acetates, and carbonates—indeed, in most cases, the salt forms of these metals are generally preferred over their elemental, metallic forms as starting ingredients for applicants' $SO_2 \rightarrow SO_3$ catalysts. For example, the preferred forms of cerium in applicants' wet reaction systems are ceria, cerium acetate, cerium nitrate and cerium carbonate. Moreover, some metal salt forms such as a ceria component of the wet reaction systems used to create the hereindescribed $SO_x$ additives may, in turn, be previously prepared by decomposing their various other salt forms such as cerium acetate, cerium nitrate, or cerium carbonate. Similarly, the more preferred forms of vanadium in applicants' $SO_X$ catalyst components will include vanadium oxide, and/or the decomposition products of various vanadium salts such as those of ammonium vanadate or vanadium oxalate.

Next, it should be noted that the calcination step of the hereindescribed processes will serve to convert any non-oxide ingredients (e.g., cerium acetate, cerium nitrate, cerium carbonate, etc.) used in the wet reaction systems into their oxide forms (e.g., cerium acetate, nitrate, carbonate, etc. will be converted to cerium oxide). It also should be noted that these $SO_2 \rightarrow SO_3$ oxidizing metals may be associated with the binder by placing them in the reaction mixtures along with the binder ingredients; or they may be made by impregnating solutions containing ions of these metals into a dried form of applicants' $SO_2 \rightarrow SO_3$ oxidation catalyst forming materials or dried forms of their $SO_3$ absorbent materials.

Supports for the Oxidants

The second general kind of ingredient in applicants' $SO_2 \rightarrow SO_3$ oxidation catalyst component is a binder (or support) material for the $SO_2 \rightarrow SO_3$ oxidation catalyst ingredient. For the purposes of this patent disclosure the terms "binder" and "support" should be regarded as being equivalent. Such binder or support materials preferably are metal oxide ingredients selected from the group consisting of magnesia, alumina ($Al_2O_3$), aluminum hydroxide compounds, aluminum-containing metal oxide compounds (other than alumina ($Al_2O_3$) or aluminum hydroxide compounds), zirconia, titania, silica, bastnaesite, various clays (and especially kaolin clay), and/or clay/phosphate materials such as those taught in U.S. Pat. Nos. 5,190,902 and 5,288,739 (hence, the teachings of these two patents are hereby incorporated by reference into this patent disclosure).

Limitations re: Supports for the Oxidants

The second and third aspects of this invention revolve round applicants' further findings that in order to effectively use the hereindescribed multi-particle $SO_X$ additive systems, the oxidant support materials and $SO_3$ absorbent materials of applicants' $SO_X$ additive systems must be made with large proportions of certain materials, and not made with certain other less undesired materials, or, at the very least, be made with relatively little of the undesired materials. These limitations and/or prohibitions in formulating applicants' multi-particle, $SO_X$ additive systems form a part of the overall novelty of this invention because the hereinafter identified "low concentration", or "prohibited", ingredients are presently used, in large proportions, in formulating a wide variety of "single particle species," $SO_X$ additives.

For example, applicants have found that the amount of alumina ($Al_2O_3$) used in their support materials for their oxidation catalyst ingredients should not constitute any more than about 10 weight percent of the overall oxidation catalyst component. More preferably, applicants' oxidation catalyst components will contain no alumina ($Al_2O_3$) whatsoever. This stands in sharp contrast to the fact that many single particle species, $SO_x$ additives are often comprised of from 50 to 95% alumina ($Al_2O_3$). Similarly, applicants have found that the amount of aluminum hydroxide compounds (as the term "aluminum hydroxide" is defined in the next paragraph) should not constitute any more than about 10 weight percent of the oxidation catalyst component of the $SO_x$ additive systems of this patent disclosure. And here again, it is even more preferred that no aluminum hydroxide compound whatsoever be used in applicants' oxidation catalyst components. This too, stands in sharp contradistinction to the fact that many aluminum hydroxide compounds are likewise used in very high concentrations in many single particle, $SO_x$ additives.

Be that as it may, for the purposes of this patent disclosure, the term "aluminum hydroxide compound(s)" should be taken to mean aluminum hydroxide in any of its many phase forms. For example, an aluminum hydroxide classification "tree diagram" such as that found on page 9, ACS Monograph 184, Industrial Alumina Chemicals, Misra, Chanakya, 1986, which is incorporated by reference herein, shows that the term "aluminum hydroxide" can have a rather broad meaning that includes many different phase forms of that compound. For example, this reference points out that there are "crystalline" forms of aluminum hydroxide that include a first group of crystalline trihydroxides $Al(OH)_3$ whose members are gibbsite, bayerite, and nordstrandite. This classification diagram also shows a second group ("Oxide-Hydroxides AlOOH") of crystalline, aluminum hydroxides comprised of boehmite and diaspore. Another separate and distinct group of aluminum hydroxides in this classification diagram is found in another branch of the tree diagram under the heading "gelatinous"—which is distinguished from the "crystalline" forms of aluminum hydroxide noted above. The gelatinous group is comprised of pseudo-boehmite and X-Ray indifferent aluminum hydroxide (which is also often referred to as "amorphous alumina"). In any case, all of these materials should be considered as "aluminum hydroxide compound(s)" for the purposes of this patent disclosure and their concentrations in the oxidation catalyst components of this patent disclosure should not be more than about 10% by weight of said oxidation catalyst component. Better yet, these materials should not be used at all in applicants' $SO_2 \rightarrow SO_3$ oxidation catalyst components. Again, these prohibitions and limitations are quite unexpected since alumina ($Al_2O_3$) and many of these alumina hydroxide compounds have been widely used, in very large proportions, in many prior art, single particle species, $SO_x$ additives.

By way of contrast, aluminum-containing compounds (that are not alumina or aluminum hydroxides) that are suitable for use in applicants' oxidation catalyst components, in proportions larger than 10 weight percent, would include compounds wherein aluminum is chemically reacted with elements, or groups of elements, other than the oxygen of alumina ($Al_2O_3$) or the $(OH)^-$ groups found in the aluminum hydroxide compounds noted in the preceding paragraph. Examples of such aluminum-containing compounds (that are not alumina or aluminum hydroxides) would include aluminum silicate, aluminum titanate, aluminum zirconate and magnesium aluminate. Such aluminum-containing compounds may constitute from about 5 to about 99 percent of applicants' overall oxidation catalyst component. The other materials suitable for use as support materials in applicants' oxidation catalyst components (e.g., magnesia, zirconia, titania, silica, bastnaesite, kaolin clay and/or clay-phosphate materials, etc.) may likewise constitute from about 5 to about 99 weight percent of the oxidation catalyst components of this patent disclosure. As a final note with respect to those other materials suitable for use as support materials for the oxidation catalyst component of applicants' $SO_x$ additive system, it is preferred that when the oxidation catalyst ingredient is a platinum group metal, then the support material should contain relatively little or no silica (e.g., no more than about 10 weight percent of the oxidation catalyst component).

$SO_3$ Absorbent Components

Although one material (e.g., a magnesia/alumina solid solution such as that prepared according to Example 1 herein) may serve as both an $SO_3$ absorbent, and its own binder material, in the practice of this invention, applicants' $SO_3$ absorbent component more preferably will comprise at least one sulfur trioxide ($SO_3$) absorbent ingredient and at least one, chemically different, support material for that $SO_3$ absorbent ingredient. All such $SO_3$ absorbent ingredient(s) will be selected primarily for their ability to both "pick up" and "give up" sulfur trioxide. Metal oxides selected from the group consisting of magnesia, alumina and calcium oxide are particularly effective as $SO_3$ absorbents in the practice of this invention.

Applicants' $SO_3$ absorbent components also may be provided with their own $SO_2 \rightarrow SO_3$ oxidation catalyst ingredient(s). By way of example only, one or more of the particle species that make up applicants' $SO_3$ absorbent component may—as an option, and not a requirement—be provided with $SO_2 \rightarrow SO_3$ catalysts selected from the group consisting of cerium, vanadium, platinum, palladium, rhodium, molybdenum, tungsten, copper, chromium, nickel, manganese, cobalt, iron, ytterbium, and uranium. Of these possible $SO_2 \rightarrow SO_3$ oxidation catalysts, vanadia has proven to be a particularly effective $SO_2$ oxidation catalyst in the context of adding a $SO_2$ oxidant to applicants' $SO_3$ absorbent component(s). It also should be noted in passing that when vanadia is used in a $SO_3$ absorbent component, it is highly preferred that the $SO_3$ absorbent also have a magnesia component as well. Applicants have found that the presence of magnesia in their $SO_3$ absorbent component(s) serves to prevent the "escape" of the vanadia from the $SO_3$ absorbent—and thereby preventing "vanadia poisoning" of the hydrocarbon cracking catalyst with which these $SO_x$ additives are used.

And, as was the case with applicants' $SO_2 \rightarrow SO_3$ oxidation catalyst components, the $SO_3$ absorbent starting ingredient metal(s) can be in their oxide, acetate, nitrate, chloride, carbonate, formate, etc. forms when they are first introduced into the wet reaction systems employed to formulate these $SO_x$ absorbent components. The metal salt forms that are most suitable for creating applicants' $SO_3$ absorbent components are preferably selected from the group consisting of calcium oxide, aluminum oxide, magnesium oxide (and especially its periclase phase), magnesium acetate, magnesium nitrate, magnesium chloride, magnesium hydroxide, magnesium carbonate, magnesium formate, magnesium aluminates, hydrous magnesium silicates (e.g., talc), magnesium calcium silicates (e.g., dolomite), and calcium silicate (e.g., wollastonite). Here again, however, applicants' calcination step will usually convert any of the non-oxide metal forms of these salts to their metal oxide forms.

Supports for $SO_3$ Absorbent Ingredients

Applicants' $SO_3$ absorbent ingredients are preferably used in conjunction with a support material selected from the group consisting of magnesia, silica ($SiO_2$), silicon-containing compounds (other than silica), alumina ($Al_2O_3$), titania, zirconia, various clays and/or clay-phosphate materials (and especially those whose phosphate source is phosphoric acid or dibasic ammonium phosphate e.g., those produced by the methods taught in U.S. Pat. Nos. 5,190,902 and 5,288,739). Again, the presence of magnesia in the $SO_3$ absorbent is highly preferred when said absorbent also has a vanadia component in the same particle.

Next, it should be noted that, for the purposes of this patent disclosure, the term "silica" should be taken to mean silicon dioxide ($SiO_2$) in any of its various phase forms. By way of contrast with the term "silica", applicants intend that the term "silicon-containing compounds (other than silica)" should be taken to mean a compound wherein a three dimensional network of cations and oxygen is formed which consists of silica tetrahedra and at least one other non-silicon containing oxide component. Examples of such silicon-containing compounds falling under applicants' use of this term would include calcium silicate, magnesium silicate, and a variety of aluminum silicates and, hence, a wide variety of clay materials that contain silicates (e.g., kaolinite, serpentine, pyrophyllite, talc, smectite montmorillonite, vermiculite, illite, mica, brittle mica, chlorite and palygorskite).

Additional Findings re: Supports for $SO_3$ Absorbent Ingredients

Applicants have found that in the case of silica ($SiO_2$), no more than about 10 weight percent of it should be used in any one particle species of applicants' $SO_3$ absorbent component. It is even more preferred that no silica ($SiO_2$) whatsoever be so employed. Applicants have also found that when kaolin clay is used in their $SO_3$ absorbent components, it too should be used in somewhat limited proportions; applicants have found for example that, contrary to the fact that many single particle species $SO_x$ additives have kaolin concentrations up to 90 percent, kaolin should not constitute more than about 50 weight percent of any given particle species of applicants' $SO_3$ absorbent component—and it is even more preferred that no more about 30% of it be used in any $SO_3$ absorbent component particle.

Applicants also would note that, for the purposes of this patent disclosure, the term "kaolin clay" should be taken to mean those clays composed of layers of silica and alumina sheets wherein the ratio of silica sheet to alumina sheet gives rise to a 1:1, dimorphic, or two-sheet, kaolin clay unit wherein the tips of the silica tetrahedra project into an hydroxyl plane of the material's octahedral sheet and replaces two thirds of the hydroxyl ions (bearing in mind that the alumina sheet in such clays has an upper and a lower plane both consisting of hydroxyl ions between which is a plane of $Al^{3+}$ ions, that are octahedrally coordinated to the hydroxyl groups). Be this definition as it may, applicants' limitations regarding kaolin are also rather surprising in that this type of clay has been widely used, in large concentrations, in many prior art, single particle, $SO_x$ additives. This admonition-limitation regarding the use of kaolin clay in applicants' $SO_3$ absorbent components also stands in sharp contrast to the fact that kaolin can be used, in large proportions, in the $SO_2 \rightarrow SO_3$ oxidation catalyst component of applicants' $SO_x$ additive systems.

Silicon can however be used in applicants' $SO_3$ absorbent components when it is a part of various compounds other than silica and kaolin clay. For example, silicon employed in the form of magnesium silicate, aluminum silicate, silicon titanate, and/or silicon zirconate may constitute up to about 40 weight percent of these support materials for the $SO_3$ absorbent. Applicants also prefer that those atoms or groups of atoms that are chemically combined with a silicon component of such non-kaolin, silicon containing compounds be present in excess of the stoichiometric amount required to react with the silicon. And as a final note on the subject of silicon-containing compounds (other than kaolin), applicants have generally found that use of aluminum silicate in applicants' $SO_3$ absorbents produces especially good results.

Still Further Findings re: $SO_3$ Absorbents

Applicants have noted that, contrary to single particle, $SO_x$ additive systems wherein only a rather limited choice of absorbents is available (e.g., the preferred $SO_x$ absorbent materials in such single particle $SO_x$ additives being magnesia and alumina), use of applicants' multi-particle $SO_x$ additive systems considerably broadens applicants' choice of the $SO_3$ absorbents to include many other materials that were heretofore unacceptable for use in single particle $SO_x$ additives. For example, oxides of the metallic elements in Group 1a and 2a of the Periodic Table have not been widely used in $SO_x$ additives, but serve nicely as $SO_x$ absorbents in applicants' $SO_3$ absorbent components. And the same is also true of various oxides of certain rare earth metals e.g., cerium, lanthanum and praseodymium.

Applicants' comparative experimental work with respect to the relative merits of single particle species $SO_x$ additives versus the multi-particle $SO_x$ additive systems of this patent disclosure generally showed that most prior art $SO_3$ absorbents can be divided into three broad categories; those that are clearly unsuitable for use in FCC units, those that absorb moderate amounts of $SO_3$ and are very stable in such units, and those that absorb large amounts of $SO_3$, but are not very stable in such high temperature environments. Generally speaking, applicants found that in using single particle species $SO_x$ additives (those having both $SO_2$ oxidants and $SO_3$ absorbents in the same particle), emphasis is better placed upon materials with moderate absorption capabilities and good stability. In applicants' multi-particle $SO_x$ additive systems, however, it has been found that there are instances where materials with high $SO_3$ absorption and low stability can be used to great advantage. For example, the results of applicants' studies regarding the relative absorption capabilities of such materials are shown in Table I.

TABLE I

| Magnesia Source | Absorption, % Weight |
| --- | --- |
| Dolomite | 78 |
| MgO (first type) | 110 |
| MgO (second type) | 147 |
| MgO (third type) | 151 |
| MgO (fourth type) | 142 |
| Magnesium Acetate | 74 |
| Magnesium Nitrate | 11 |
| Magnesium Chloride | 57 |
| Magnesium Hydroxide | 79 |
| Magnesium Carbonate | 144 |
| Magnesium Formate | 105 |

Some of the more absorbent magnesium-containing compounds performed very well in applicants' $SO_x$ absorbent components even though they do not perform particularly well in single particle $SO_x$ additives. Applicants also have found that magnesia is particularly effective as a $SO_3$ absorbent ingredient in their $SO_x$ absorbent components when the magnesia ingredient is obtained from thermal decomposition of certain magnesia salts such as magnesium acetate, magnesium hydroxy acetate and magnesium formate.

Additional Findings re: Hardening Agents

One of the major disadvantages of using magnesia in applicants' $SO_3$ absorbents is that particles that contain large percentages of it tend to be too "soft" for use in FCC units. To correct this deficiency with respect to FCC applications (fluid-bed and fixed-bed systems are not as sensitive to this concern), applicants found that use of certain well known hardening agents can be used to great advantage. In general, applicants have found that such hardening agents should be powdered materials that are insoluble in the reaction slurry used to formulate the ingredients for the $SO_3$ absorbent component. Preferably, powered materials will have particles whose average diameters of less than about 2.5 microns. It is also preferred that these hardening agents not be chemically reactive with the other ingredients in the wet reaction slurry into which they are introduced. Another desired property of these hardening agents is their own inherent ability to absorb $SO_3$. To these ends, applicants have found that some particularly useful hardening agents for the practice of this invention are various forms of aluminum silicates, magnesium aluminates, magnesium silicate and magnesium calcium silicate. Moreover, certain natural and synthetic clays, that are active cracking catalysts, also can be used to advantage as hardening agents in applicants' $SO_3$ absorbent components since they too contain active sites that are capable of absorbing $SO_3$. Examples of clays useful in this regard would include halloysite, rectorite, hectorite, montmorillinite, synthetic montmorillinite, sepiolite, activated sepiolite and, with the previously noted proportion limitation (i.e., not more than 50 weight percent of the $SO_3$ absorbent component), kaolin.

Expressed in patent claim language, applicants' $SO_x$ additive systems will comprise a $SO_2 \rightarrow SO_3$ oxidation catalyst component and an $SO_3$ absorbent component wherein: (1) the $SO_2 \rightarrow SO_3$ oxidation catalyst is comprised of a metal selected from the group consisting of a metal having an atomic number of at least 20, a metal from Group 1b of the Periodic Table, a metal from Group 2b of the Periodic Table, a metal from Groups III to VIII of the Periodic Table and a rare earth metal of the Periodic Table; and (b) a binder selected from the group of metal-containing compounds consisting of magnesia, alumina, aluminum-containing metal oxide compound, aluminum hydroxide, clay, zirconia, titania, silica, clay/phosphate material and bastnaesite and which, if employed at all, contains no more than about 10 weight percent aluminum hydroxide and no more than about 10 weight percent alumina ($Al_2O_3$); and (2) the $SO_3$ absorbent component is physically separate and distinct from the $SO_2 \rightarrow SO_3$ oxidation catalyst component and comprises: (a) a metal oxide selected from the group consisting of magnesia, alumina and calcium oxide and, as an optional ingredient, a support material selected from the group of metal oxides consisting of magnesia, alumina, silica, kaolin clay, titania clays, clay/phosphate material and zirconia and, which, if employed at all, contains no more than about 10 weight percent silica and no more than about 50 weight percent kaolin clay.

FURTHER DETAILED DESCRIPTIONS OF THE INVENTION

Relative Proportions of Ingredients

The relative proportions of the various ingredients in applicants' initial, "wet" reaction compositions, will not equal the relative proportions of those ingredients in the "dry", post-calcined, end products (e.g., in the microspheroidal particle or pellet forms in which applicants' products are ultimately made and then used). This follows from the fact that the liquid media and certain volatile ingredient(s) that are used to create applicants' initial, wet, reaction compositions will be virtually completely driven off during applicants' subsequent spray drying and calcining steps. Indeed, many of these ingredients will undergo a change in their chemical identity as a result of applicants' calcination step. For example, magnesium acetate, carbonate, nitrate, etc. ingredients will each be converted to magnesium oxide as a result of the calcination step of applicants' overall manufacturing process. Thus, TABLE II below gives the broad ranges and the preferred concentration for the various ingredients that comprise applicants' post-calcined, "dry", end product $SO_x$ additives. It also should be understood that many optional ingredients (other than optional hardening agent ingredients that take the form of metal oxides) can be used to enhance the manufacturing of either the $SO_2 \rightarrow SO_3$ oxidation catalyst component or the $SO_3$ absorbent component of applicants' $SO_x$ additive systems. These optional ingredients might include viscosity agents, gas evolution agents, etc. If they are used, they will usually constitute from about 1 to about 20 weight percent of a given "wet" reaction mixture. For the most part, however, most optional ingredients of these latter kinds will be used to enhance the manufacturing process, but will be completely driven off by applicant's spray drying and/or calcination steps. In any event, regarding the ingredients that are found in applicants' post-calcined materials, the preferred concentrations thereof are:

TABLE II $SO_x$ Additive Systems

| | Wt. % Range | Wt. % Preferred |
|---|---|---|
| $SO_2 \rightarrow SO_3$ Oxidation Catalyst Component | | |
| $SO_2 \rightarrow SO_3$ oxidant | 5 to 95 | 30 |
| Binder material | 5 to 95 | 70 |
| Total | 100% | 100% |
| $SO_3$ Absorbent Component | | |
| $SO_3$ absorbent | 5 to 100 | 60 |
| $SO_3$ Support | 5 to 100 | 30 |
| Optional Hardening Agent Ingredient(s) | 0 to 20 | 8 |
| Optional $SO_2 \rightarrow SO_3$ Oxidation Catalyst Ingredient | 0 to 5 | 2 |
| Total | 100% | 100% |

Spray Drying Operations

When they are used, the spray drying processes used to create microspheroidal forms of applicants' $SO_2 \rightarrow SO_3$ oxidant catalyst components and $SO_3$ absorbent components each can be carried out by well known techniques. Generally speaking, such spray drying should be designed to produce microspheroidal particles having a range of sizes such that essentially all such particles will be retained by a Standard U.S. 200 mesh screen and essentially all such particles will be passed by a Standard U.S. 60 mesh screen.

Optional Drying Procedures

It should also be noted that in addition to a spray drying step that may be used to produce microspheroidal forms of applicants' $SO_2 \rightarrow SO_3$ oxidation catalyst components and $SO_3$ absorbent components, the hereindescribed manufacturing processes may be further enhanced by use of separate and distinct drying steps. They normally will be carried out after the drying which naturally results from the spray drying step (or from those other drying steps used to produce pellet forms of applicants' materials). Such additional drying will further serve to remove any remaining traces of the liquid medium used to create the reaction mixtures which may be still present in the interstices of the particles and/or associated with such materials as water of hydration. Drying times for such distinct drying steps will normally take from about 0.2 hours to about 24 hours at temperatures which preferably range from about 200° F. to about 500° F. (at atmospheric pressure), but in all cases, at temperatures greater than the boiling point of the liquid medium employed (e.g., greater than 212° F. in the case of water) in the "wet" reaction compositions.

Calcining Procedures

After spray drying (in the case of microspheroidal particles) or desiccation (in the case of pellet forms of applicants' materials)—it remains only to take the solid matrix of the anhydrous materials thus produced and convert their various non-oxide ingredients to their oxide forms. This is preferably done by a calcination step. In effect, the calcination step serves to drive off any volatile components and replace them with oxygen and thereby produce a final product having predominantly the oxide forms of the ingredients. The calcination step also serves to drive off, as gaseous oxides, all but the "desirable" components of the resulting metal oxide materials. For example, this calcination step will drive off the liquid media and any acid, viscosity agent and/or gas evolution agents that may have been used in the original wet, reaction mixture that existed before drying procedures were implemented. Such calcination is readily accomplished by heating the products of the spray drying step—or of the optional desiccation step—at temperatures ranging from about 600° C. to about 700° C. (preferably at atmospheric pressure) for from about 20 minutes to about 60 minutes, and most preferably at about 650° C. for about 30 minutes.

TGA Measurements

Measurements of the absorption rate of $SO_X$ on various experimental additives were obtained on a modified thermogravimetric analysis unit (TGA). The equipment consisted of a Polymer Laboratories STA 1500® thermogravimetric unit coupled with a microcomputer. Generally speaking, approximately 10 milligrams of a given sample was loaded into a ceramic sample boat and heated under various conditions. $SO_X$ pick-up was normalized to the weight at the point where $SO_X$ gas commenced to be introduced. The composition of the $SO_2$ mix gas employed was usually 2000 ppm $SO_2$, 5% $CO_2$, 1% $O_2$, with the balance being nitrogen. In the case of tests of $SO_2 \rightarrow SO_3$ oxidants, mixtures (e.g., 50/50 mixtures by weight) of an absorbent and an oxidant were used and the weight of the $SO_3$ picked up the absorbent was measured. In general, when the objective of the experiment was to test an $SO_2 \rightarrow SO_3$ oxidant, a standard absorbent was used; this standard absorbent was prepared by the process described in Example 1. In other experiments, unsupported magnesia powder was employed.

On the other hand, when the purpose of an experiment was to test an absorbent, a standard oxidant, prepared as described in Example 7, was used. The results of the TGA experiments were taken in two forms. In one, the percent weight change after two hours of exposure to the $SO_2$ gas mixture was measured. This result gave the maximum absorption capability of the mixture. In the second form of reporting the results was a calculation of the initial rate of absorption; these results were expressed as the % change in weight of the sample per minute. To these ends, applicants established certain criteria based on the TGA results that must be met by a $SO_x$ additive if it is to have commercial viability. For example, applicants have found that a $SO_x$ additive must have an initial pick-up rate of at least about 0.10 percent per minute in such tests, it also preferably will have a maximum absorption of 40% by weight and lastly it must be regenerable. That is to say that after it reaches its maximum gain in weight it must rapidly return to the base line when hydrogen is passed over the sample. Applicants have also found that if a $SO_x$ additive has a maximum absorption greater than 40%, this improvement is not always realized in commercial operations. For example, applicants developed an additive that had a maximum pickup of 70% on the TGA; in commercial trials however this material did not perform any better than an additive with a 50% maximum pickup. That is to say there was no corresponding reduction in the amount of additive required to remove a certain amount of $SO_x$.

Comparisons with Certain Prior Art Single Particle Species, $SO_x$ Additives

Applicants conducted various tests aimed at comparing the multi-particle, $SO_x$ additive systems of this patent disclosure with various prior art, single particle, $SO_x$ additives. These comparative tests were largely based upon comparative TGA tests. By way of example only, the results of some of these tests are summarized in TABLE III.

TABLE III

| Composition | Percent Increase in mass after 2 hours (weight percent) | Initial Rate of Absorption (weight percent/ minute) |
| --- | --- | --- |
| Single Particle $SO_x$ Additive | 61 | 1.9 |
| Dual Particle Sample A* | 48 | 1.5 |
| Dual Particle Sample B* | 53 | 1.6 |
| Dual Particle Sample C* | 52 | 1.6 |

*Note that the following statements help to better describe the Dual Particle samples:
Sample A: Sample A was comprised of a mixture of absorbent particles from Example 1 and oxidant particles from Example 7. The mixture contained 50 weight percent absorbent and 50 weight percent oxidant.
Sample B: Sample B was comprised of a mixture of absorbent particles from Example 2 and oxidant particles from Example 6. The mixture contained 50 weight percent absorbent and 50 weight percent oxidant.
Sample C: Sample C was comprised of a mixture of absorbent particles from Example 3 and oxidant particles from Example 6. The mixture contained 50 weight percent absorbent and 50 weight percent oxidant.

*Note that the following statements help to better describe the Dual Particle samples:

Sample A

Sample A was comprised of a mixture of absorbent particles from Example 1 and oxidant particles from Example 7. The mixture contained 50 weight percent absorbent and 50 weight percent oxidant.

Sample B

Sample B was comprised of a mixture of absorbent particles from Example 2 and oxidant particles from Example 6. The mixture contained 50 weight percent absorbent and 50 weight percent oxidant.

Sample C

Sample C was comprised of a mixture of absorbent particles from Example 3 and oxidant particles from Example 6. The mixture contained 50 weight percent absorbent and 50 weight percent oxidant.

In all cases, the initial rate of absorption was determined for the first 15 minutes of $SO_x$ pickup.

Other Findings re: Comparative Tests

Applicants' comparative experimental program also established that many hydrocarbon cracking catalysts commonly used in FCC units display some, albeit limited, ability to absorb $SO_3$. This is probably due to the widespread use of certain active forms of alumina in many FCC hydrocarbon cracking catalysts. Applicants believe that the limitations on the ability of these materials to absorb $SO_3$ generally follows from the fact that there are no $SO_2 \rightarrow SO_3$ oxidant catalyst materials in such hydrocarbon cracking catalyst particles. In other words, applicants concluded that many hydrocarbon cracking catalysts could also serve to absorb $SO_3$ if a oxidation catalyst for converting $SO_2$ to $SO_3$ also were used in conjunction with the hydrocarbon cracking catalysts. Applicants also found that this can be achieved even when at least one oxidation catalyst is not physically associated with an $SO_3$ absorbent in the same additive particle and not physically associated with a hydrocarbon cracking catalyst in the same particle. Several of applicants' experiments confirmed that all of this was indeed the case. When applicants' $SO_3$ absorbent materials were in fact added to such hydrocarbon cracking systems, it was found that a wide variety of FCC hydrocarbon cracking catalyst (and especially bottoms cracking systems) also serve to absorb $SO_3$ while still performing their hydrocarbon cracking function—if sufficient capability to catalyze the conversion of $SO_2$ to $SO_3$ exists in the overall catalyst system. Applicants also found that their $SO_x$ additive systems can provide this "extra" $SO_2$ to $SO_3$ oxidation function particularly well when they are used in admixture with hydrocarbon cracking catalysts and can, therefore, form the basis of particularly effective hydrocarbon cracking catalyst/$SO_x$ additive systems—and especially those comprised of a major amount (e.g., 90–99.5% by weight—on a dry weight basis) of a bulk, hydrocarbon cracking catalyst and a minor amount (e.g., 0.5–10% by weight on a dry weight basis) of applicants' $SO_x$ additive system.

Expressed in patent claim language such methods for extending the useful life of a $SO_x$ additive system having a $SO_2 \rightarrow SO_3$ oxidation catalyst component and a $SO_3$ absorbent component will comprise: (1) employing the $SO_x$ additive system in the form of at least two physically distinct particle species wherein a first particle species contains the $SO_2 \rightarrow SO_3$ oxidation catalyst component and carries out a primary function of oxidizing sulfur dioxide to sulfur trioxide and the second particle species is physically separate and distinct from the first particle species and carries out the function of absorbing the $SO_3$ produced by the $SO_2 \rightarrow SO_3$ oxidation catalyst component; (2) employing the $SO_2 \rightarrow SO_3$ oxidation catalyst component in the form of first particle that comprises: (a) a sulfur $SO_2 \rightarrow SO_3$ oxidation catalyst comprised of a metal selected from the group consisting of a metal having an atomic number of at least 20, a metal from Group 1b of the Periodic Table, a metal from Group 2b of the Periodic Table, a metal from Groups III and VIII of the Periodic Table and a rare earth metal of the Periodic Table; and (b) a binder selected from the group of metal-containing compounds consisting of magnesia, alumina, aluminum-containing metal oxide compound, aluminum hydroxide, clay, zirconia, titania, silica, clay, clay/phosphate material and bastnaesite and which, if employed at all, contains no more than about 10 weight percent aluminum hydroxide and no more than about 10 weight percent alumina ($Al_2O_3$); and (3) using the $SO_3$ absorbent component in the form of a second particle that comprises: (a) a metal oxide selected from the group consisting of magnesia and calcium oxide, and, as an optional ingredient, a support material selected from the group of metal oxides consisting of magnesia, silica, alumina, titania, kaolin clay, clay/phosphate material and zirconia, and which, if employed at all, contains no more than about 10 weight percent silica and no more than about 50 weight percent kaolin clay.

Representative $SO_3$ Absorbent Systems

EXAMPLE 1

An alumina/magnesium hydroxy acetate/clay slurry was prepared by adding 2495 grams of Condea P-3® Alumina Sol to 10.29 liters of water containing 111 grams of 84% concentrated acetic acid. The additions were performed under moderate agitation conditions. Thereafter, 2343 grams of Condea P3® Alumina Sol, prepared in the manner noted above were added to 2523 grams of magnesium hydroxy acetate. To the resulting slurry, 345 grams of Theile RC-32® kaolin clay and 800 grams water were added. The resulting slurry was spray dried and the particle products of the spray drying were calcined at 650° C. for 30 minutes in a muffle furnace.

EXAMPLE 2

An alumina/magnesium hydroxy acetate/vanadium oxalate slurry was prepared by adding 2495 grams of Condea P-3® Alumina Sol to 10.29 liters of water that contained 111 grams of 84% concentrated acetic acid. These additions were performed under moderate agitation conditions. Thereafter, 2524 grams of P3® alumina sol, prepared in the manner described above, was added to 2524 grams of magnesium hydroxy acetate. To the resulting slurry, 211 grams of vanadium oxalate and 800 grams of water were added. The slurry was then spray dried and the resulting particles calcined at 650° C. for 30 minutes in a muffle furnace.

EXAMPLE 3

An alumina/magnesium hydroxy acetate/clay/vanadium oxalate slurry was prepared by adding, under moderate agitation, 2495 grams of Condea P-3® Alumina Sol to 10.29 liters of water containing 111 grams of 84% concentrated acetic acid. The additions were performed under moderate agitation. Thereafter, 2246 grams of Condea P3® Alumina Sol, prepared as noted above, were added to 2419 grams of magnesium hydroxy acetate. To the resulting slurry, 345 grams of Theile RC-32® kaolin clay slurry, 211 grams vanadium oxalate and 500 grams of water were added. The slurry was spray dried and the resulting particles calcined at 650° C. for 30 minutes in a muffle furnace.

EXAMPLE 4

An alumina sol was first prepared by adding 2495 grams Condea P-3 Alumina Sol to 10.29 liters water containing 111 grams 84% concentrated acetic acid. The additions were performed under moderate agitation conditions. Next, an aqueous slurry of magnesium silicate (R. T. Vanderbilt Ceramitalc No. 1) was prepared to produce a 37% solids concentration. The resulting slurry was reduced in particle size using a commercially available attritor mill. The duration of milling was determined by the time required to obtain an average particle size of 2–3 $\mu$m. 2343 grams of Condea P3 alumina sol, prepared as noted above, was added to 2523 grams of magnesium hydroxy acetate. To this slurry, 490 grams of the magnesium silicate slurry and 800 grams water were added. The completed slurry was spray dried and then calcined at 650° C. for 30 minutes in a muffle furnace.

EXAMPLE 5

2501 grams of P3 alumina sol was added to 2023 grams of magnesium hydroxy acetate. To this slurry, 409 grams of cerium nitrate was added; this was followed by the addition of 213 grams of vanadium oxalate and 382 grams of Theile RC-32 kaolin clay slurry. The slurry was spray dried and then calcined at 650° C. for 30 in a muffle furnace.

Representative $SO_2 \rightarrow SO_3$ Oxidant/Binder Systems

EXAMPLE 6

2092 grams of P3 alumina sol was added to 1692 grams of magnesium hydroxy acetate. To this slurry, 897 grams of cerium nitrate was added; this was followed by the addition of 382 grams of Theile RC-32 kaolin clay slurry to the system. The slurry was spray dried and then calcined at 650° C. for 30 minutes in a muffle furnace.

EXAMPLE 7

1864 grams of P3 alumina sol was added to 1508 grams of magnesium hydroxy acetate. To this slurry, 897 grams of cerium nitrate was added; this was followed by the addition of 448 grams of vanadium oxalate and 382 grams of Theile RC-32 kaolin clay slurry. The slurry was spray dried and then calcined at 650° C. for 30 minutes in a muffle furnace.

EXAMPLE 8

A commercially available oxidation catalyst sold under the trade name COP 850 was used as an oxidant. This material consists of 850 ppm of platinum impregnated on a substrate of alpha alumina.

EXAMPLES 9–13

The following $SO_x$ pick up test results were produced by mixtures of absorbent particles and oxidant particles. The Thermogravimetric Analyzer previously described was used as the $SO_x$ pick up measuring instrument. The $SO_x$ absorbence results of the various mixtures were compared to those produced by a single particle. These measurements are summarized in the following Table IV:

TABLE IV

| Test Sample Made According to Example | Absorbent | Oxidant | Increase in mass after 2 hours, % wt. | Initial rate of Absorption, % wt/min. |
|---|---|---|---|---|
| 5 | Single Particle | | 63 | 1.9 |
| 9 | 50% Ex. 1 | 50% Ex. 7 | 51 | 1.8 |
| 10 | 50% Ex. 2 | 50% Ex. 6 | 57 | 1.7 |
| 11 | 50% Ex. 3 | 50% Ex. 6 | 53 | 1.7 |
| 12 | 50% Ex. 4 | 50% Ex. 6 | 55 | 1.7 |
| 13 | 75% Ex. 2 | 25% Ex. 8 | 55 | 2.0 |

Representative $SO_2 \rightarrow SO_3$ Oxidant in Clay-Phosphate Binder Systems

EXAMPLE 14

A clay/phosphate/cerium nitrate solution was prepared (according to the general teachings of U.S. Pat. No. 5,190,902) by adding 1403 grams of Theile RC-32® kaolin clay slurry to 591 milliliters of water in a high speed mixer. To this mixture, 192 grams of phosphoric acid was then added. To the resulting system, 440 grams of cerium nitrate solution was added. The slurry formulation was then spray dried and the resulting particles calcined at 650° C. for 30 minutes in a muffle furnace. The calcined particles were then mixed with magnesium oxide in a 50/50 weight percent ratio and the resulting material analyzed by a TGA test that showed a $SO_x$ absorption rate of 0.21% per minute for the end product material.

EXAMPLE 15

A clay/phosphate/cerium nitrate, vanadium oxalate slurry was prepared by adding 1340 grams of Theile RC-32® kaolin clay slurry to 1795 milliliters of water in a high speed mixer. To this mixture, 192 grams of phosphoric acid was added. Thereafter, 431 grams of cerium nitrate solution and 232 grams of vanadium oxalate solution were added to the slurry. The slurry was then spray dried and then resulting particles were calcined at 650° C. for 30 minutes in a muffle furnace. The calcined particles were then mixed with magnesium oxide in a 50/50 weight percent ratio and analyzed by TGA tests. These tests indicated that the resulting material produced an $SO_x$ absorption of 0.27% per minute.

EXAMPLE 16

A clay/phosphate/cerium carbonate slurry, was prepared by adding 1403 grams of Theile RC-32® kaolin clay slurry to 1200 milliliters of water in a high speed mixer. To this mixture, 192 grams of phosphoric acid was added; thereafter 277 grams of cerium carbonate were added. The completed slurry was spray dried and the resulting particles calcined at 650° C. for 30 minutes in a muffle furnace. The calcined material was then mixed with magnesium oxide in a 50/50 weight percent ratio and analyzed by the TGA tests, which showed a $SO_x$ absorption of 0.15% per minute.

Collectively, Examples 9–13 show that a physical mixture of an absorbent (Examples 1–4) and an oxidant (Examples 6–8) give the same $SO_x$ removal as a single particle (Example 5). Example 9 is a mixture of alumina/magnesia absorbent with kaolin clay used as a hardening agent mixed with an oxidant containing ceria and vanadia (Example 7). Example 10 is a mixture of an absorbent (made according to Example 2) in which one of the oxidants, in this case vanadia, is included with the absorbent; the other oxidant, ceria, is in the particle in admixture with the absorbent (made according to Example 6). The significance of this experiment lies in the fact that while vanadia is a minor component in the additive system it is considered to be a catalyst "poison;" hence, including it with the magnesia/alumina insures that it is immobilized and thus cannot be transferred by sublimation from the $SO_x$ additive mixture to the host catalyst. Example 11 is identical to Example 10 with the exception that kaolin clay is used as a hardening agent in a magnesia/alumina/vanadia absorbent. Example 12 is the same as Example 9 except that magnesium silicate is used as the hardening agent instead of clay. In Example 13 a commercially available oxidation catalyst consisting of platinum on alumina is used in place of the ceria oxidant. The significance of this example is that many FCC units are already using a platinum promoter to convert carbon monoxide to carbon dioxide and this same material may also serve to convert sulfur dioxide to sulfur trioxide and thus the need for a ceria oxidant can be greatly reduced or eliminated entirely.

While this invention has been described with respect to various specific examples and a spirit which is committed to the concept of the use of multi-particle $SO_x$ additive systems, it is to be understood that the hereindescribed invention should only be limited by the scope of the following claims. Thus,

What is claimed is:

1. A fluid $SO_x$ additive system comprising $SO_2 \rightarrow SO_3$ oxidation catalyst particles and $SO_3$ absorbent particles wherein:

(1) the $SO_2 \rightarrow SO_3$ oxidation catalyst particles comprise:

(a) a $SO_2 \rightarrow SO_3$ oxidation catalyst comprised of a metal selected from the group consisting of a metal having an atomic number of at least 20, a metal from Group 1b of the Periodic Table, a metal from Group 2b of the Periodic Table, a metal from Groups III to VIII of the Periodic Table and a rare earth metal of the Periodic Table; and (b) a binder selected from the group of metal-containing compounds consisting of aluminum silicate, aluminum titanate, aluminum zirconate, magnesium aluminate, magnesia, alumina, aluminum hydroxide, clay, zirconia, titania, silica, clay/phosphate material, bastnaesite and which, if employed at all, contains no more than about 10 weight percent aluminum hydroxide and no more than about 10 weight percent alumina ($Al_2O_3$); and (2) the $SO_3$ absorbent particles are physically separate and distinct from the $SO_2 \rightarrow SO_3$ oxidation catalyst particles and comprise a metal oxide selected from the group consisting of magnesia, alumina and calcium oxide.

2. The fluid system of claim 1 wherein the $SO_2 \rightarrow SO_3$ oxidation catalyst particles contain a metal selected from the group consisting of cerium, vanadium, platinum, palladium, rhodium, molybdenum, tungsten, copper, chromium, nickel, manganese, cobalt, iron, ytterbium, and uranium.

3. The fluid $SO_x$ additive system of claim 1 wherein the $SO_2 \rightarrow SO_3$ oxidation catalyst particles are comprised of ceria and vanadia.

4. The fluid $SO_x$ additive system of claim 1 wherein the binder for the $SO_2 \rightarrow SO_3$ oxidation catalyst particles is comprised of a solid solution of magnesia and alumina.

5. The fluid $SO_x$ additive system of claim 1 wherein the oxidation catalyst particles contain no aluminum hydroxide and no alumina ($Al_2O_3$).

6. The fluid $SO_x$ additive system of claim 1 wherein the $SO_3$ absorbent particles further comprise a hardening agent.

7. The fluid $SO_x$ additive system of claim 1 wherein the $SO_3$ absorbent particles further comprise a hardening agent selected from the group consisting of aluminum silicate, magnesium aluminate, magnesium silicate, magnesium calcium silicate and sepiolate.

8. The fluid $SO_x$ additive system of claim 1 wherein the $SO_3$ absorbent particles further comprise a $SO_2 \rightarrow SO_3$ oxidation catalyst that is used in addition to the $SO_2 \rightarrow SO_3$ oxidation catalyst in the $SO_2 \rightarrow SO_3$ oxidation particles.

9. The fluid $SO_x$ additive system of claim 1 wherein the $SO_3$ absorbent particles further comprise a $SO_2 \rightarrow SO_3$ oxidation catalyst selected from the group consisting of cerium, vanadium, platinum, palladium, rhodium, molybdenum, tungsten, copper, chromium, nickel, manganese, cobalt, iron, ytterbium, and uranium.

10. The fluid $SO_x$ additive system of claim 1 wherein the $SO_3$ absorbent particles further comprise a $SO_2 \rightarrow SO_3$ oxidation catalyst that has a vanadia component.

11. The fluid $SO_x$ additive system of claim 1 wherein the $SO_3$ absorbent particles further comprise a $SO_2 \rightarrow SO_3$ oxidation catalyst that has a vanadia component and a $SO_3$ absorbent component that has a magnesia component.

12. The fluid $SO_x$ additive system of claim 1 wherein the $SO_2 \rightarrow SO_3$ oxidation catalyst particles are themselves comprised of at least two separate and distinct particle species.

13. The fluid $SO_x$ additive system of claim 1 wherein the $SO_3$ absorbent particles are themselves comprised of at least two separate and distinct particle species.

14. The fluid $SO_x$ additive system of claim 1 wherein the $SO_2 \rightarrow SO_3$ oxidation catalyst particles and the $SO_3$ absorbent particles are each microspheroidal, particles suitable for circulation in an FCC unit in admixture with at least one microspheroidal particle species whose primary function is to catalytically crack a hydrocarbon feedstock.

15. The fluid $SO_x$ additive system of claim 1 wherein the $SO_2 \rightarrow SO_3$ oxidation catalyst particles and the $SO_3$ absorbent particles are each separate and distinct pellets.

16. The fluid $SO_x$ additive system of claim 1 wherein the $SO_2 \rightarrow SO_3$ oxidation catalyst particles and the $SO_3$ absorbent particles are each separate and distinct pellets of a size suitable for use in a fluid bed catalyst system.

17. The fluid $SO_x$ additive system of claim 1 wherein the $SO_2 \rightarrow SO_3$ oxidation catalyst particles comprise from about 10 to about 90 weight percent of said $SO_x$ additive system.

18. The fluid $SO_x$ additive system of claim 1 wherein said fluid $SO_x$ additive system comprises from about 0.5 to about 10.0 weight percent of a bulk hydrocarbon cracking catalyst/$SO_x$ additive system.

19. A fluid $SO_x$ additive system comprising $SO_2 \rightarrow SO_3$ oxidation catalyst particles and an $SO_3$ absorbent particles wherein:

(1) the $SO_2 \rightarrow SO_3$ oxidation catalyst particles comprise:

(1) a $SO_2 \rightarrow SO_3$ oxidation catalyst comprised of a metal having an atomic number of at least 20, a metal from Group 1b of the Periodic Table, a metal from Group 2b of the Periodic Table, a metal from Groups III to VIII of the Periodic Table and a rare earth metal of the Periodic Table; and (b) a binder selected from the group of metal-containing compounds consisting of aluminum silicate, aluminum titanate, aluminum zirconate, magnesium aluminate, magnesia, alumina, aluminum hydroxide, clay, zirconia, titania, silica, clay/phosphate material and bastnaesite and which, if employed at all, contains no more than about 10 weight percent aluminum hydroxide and no more than about 10 weight percent alumina ($Al_2O_3$); and (2) the $SO_3$ absorbent particles are physically separate and distinct from the $SO_2 \rightarrow SO_3$ oxidation catalyst particles and comprises: (a) a metal oxide selected from the group consisting of magnesia, alumina and calcium oxide and (b) a support material selected from the group of metal oxides consisting of magnesia, alumina, silica, kaolin clay, titania, clay/phosphate material and zirconia and, which, if employed at all, contains no more than about 10 weight percent silica and no more than about 50 weight percent kaolin clay.

20. The fluid $SO_x$ additive system of claim 19 wherein the $SO_2 \rightarrow SO_3$ oxidation catalyst particles contain a metal selected from the group consisting of cerium, vanadium, platinum, palladium, rhodium, molybdenum, tungsten, copper, chromium, nickel, manganese, cobalt, iron, ytterbium, and uranium.

21. The fluid $SO_x$ additive system of claim 19 wherein the $SO_2 \rightarrow SO_3$ oxidation catalyst particles are comprised of ceria and vanadia.

22. The fluid $SO_x$ additive system of claim 19 wherein the binder of the $SO_2 \rightarrow SO_3$ oxidation catalyst component is comprised of a solid solution of magnesia and alumina.

23. The fluid $SO_x$ additive of claim 19 wherein the oxidation catalyst component contains no aluminum hydroxide and no alumina ($Al_2O_3$).

24. The fluid $SO_x$ additive system of claim 19 wherein the $SO_3$ absorbent component further comprises a hardening agent.

25. The fluid $SO_x$ additive system of claim 19 wherein the $SO_3$ absorbent component further comprises a hardening agent selected from the group consisting of aluminum silicate, magnesium aluminate, magnesium silicate, calcium silicate and sepiolite.

26. The fluid $SO_3$ additive system of claim 19 wherein the $SO_x$ absorbent particles further comprise a $SO_2 \rightarrow SO_3$ oxidation catalyst that is used in addition to the $SO_2 \rightarrow SO_3$ oxidation catalyst in the $SO_2 \rightarrow SO_3$ oxidation catalyst particles.

27. The fluid $SO_x$ additive system of claim 19 wherein the $SO_3$ absorbent component further comprises a $SO_2 \rightarrow SO_3$ oxidation catalyst selected from the group consisting of cerium, vanadium, platinum, palladium, rhodium, molybdenum, tungsten, copper, chromium, nickel, manganese, cobalt, iron, ytterbium, and uranium.

28. The fluid $SO_x$ additive system of claim 19 wherein the $SO_3$ absorbent component further comprises a $SO_2 \rightarrow SO_3$ oxidation catalyst that has a vanadia component.

29. The fluid $SO_x$ additive system of claim 19 wherein the $SO_3$ absorbent component further comprises a $SO_2 \rightarrow SO_3$ oxidation catalyst that has a vanadia component and a $SO_3$ absorbent component that has a magnesia component.

30. The fluid $SO_x$ additive system of claim 19 wherein the $SO_2 \rightarrow SO_3$ oxidation catalyst component is itself comprised of at least two separate and distinct particle species.

31. The fluid $SO_x$ additive system of claim 19 wherein the $SO_3$ absorbent component is itself comprised of at least two separate and distinct particle species.

32. The fluid $SO_x$ additive system of claim 19 wherein the $SO_2 \rightarrow SO_3$ oxidation catalyst component and the $SO_3$ absorbent component are each microspheroidal, particles suitable for circulation in an FCC unit in admixture with at least one microspheroidal particle species whose primary function is to catalytically crack a hydrocarbon feedstock.

33. The fluid $SO_x$ additive system of claim 19 wherein the $SO_2 \rightarrow SO_3$ oxidation catalyst component and the $SO_3$ absorbent component are each pellets.

34. The fluid $SO_x$ additive system of claim 19 wherein the $SO_2 \rightarrow SO_3$ oxidation catalyst component and the $SO_3$ absorbent component are each pellets of a size suitable for use in a fluid bed catalyst system.

35. The fluid $SO_x$ additive system of claim 19 wherein the $SO_2 \rightarrow SO_3$ oxidation catalyst component comprises from about 10 to about 90 weight percent of said $SO_x$ additive system.

36. The fluid $SO_x$ additive system of claim 19 wherein said $SO_x$ additive system comprises from about 0.5 to about 10.0 weight percent of a bulk hydrocarbon cracking catalyst/$SO_x$ additive system.

* * * * *